United States Patent
Wilton et al.

(10) Patent No.: US 10,203,005 B2
(45) Date of Patent: Feb. 12, 2019

(54) PASSIVE OPENING LOW LOSS CLUTCH PACK

(71) Applicant: GM Global Technology Operations LLC, Detroit, MI (US)

(72) Inventors: Daryl A. Wilton, Macomb, MI (US); James M. Hart, Belleville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 149 days.

(21) Appl. No.: 15/340,143

(22) Filed: Nov. 1, 2016

(65) Prior Publication Data

US 2018/0119751 A1    May 3, 2018

(51) Int. Cl.
| F16D 13/52 | (2006.01) |
| F16D 13/58 | (2006.01) |
| F16D 13/69 | (2006.01) |
| F16D 25/0638 | (2006.01) |

(52) U.S. Cl.
CPC ......... *F16D 25/0638* (2013.01); *F16D 13/52* (2013.01); *F16D 13/58* (2013.01); *F16D 13/69* (2013.01)

(58) Field of Classification Search
CPC .......... F16D 13/66; F16D 13/69; F16D 13/52; F16D 13/58; F16D 25/0638
See application file for complete search history.

(56) References Cited

U.S. PATENT DOCUMENTS

| 4,356,901 A * | 11/1982 | Koehler .............. F16D 13/683 188/218 XL |
| 6,508,337 B1 * | 1/2003 | Esper .................... F16D 21/08 188/71.5 |
| 7,249,663 B2 | 7/2007 | Mordukhovich et al. |
| 7,578,376 B2 | 8/2009 | Borgerson et al. |
| 7,798,299 B2 | 9/2010 | Schultz |
| 7,802,667 B2 | 9/2010 | Raszkowski et al. |
| 7,841,457 B2 | 11/2010 | Crafton et al. |
| 7,931,135 B2 | 4/2011 | Dougan et al. |
| 7,967,561 B2 | 6/2011 | Samie et al. |
| 8,075,441 B2 | 12/2011 | Hart et al. |
| 8,090,512 B2 | 1/2012 | Cao et al. |
| 8,100,802 B2 | 1/2012 | Lee et al. |
| 8,105,196 B2 | 1/2012 | Portell et al. |
| 8,123,014 B2 | 2/2012 | Wooden |
| 8,162,085 B2 | 4/2012 | Burnett et al. |
| 8,172,058 B2 | 5/2012 | Grochowski et al. |

(Continued)

*Primary Examiner* — Richard M Lorence
*Assistant Examiner* — Lori Wu

(57) ABSTRACT

A passive opening transmission clutch system includes a backing plate having multiple tab slots, each of the tab slots having a tapered wall. A first reaction plate has multiple first tapered spline teeth oriented transverse to a plane of the first reaction plate. The first tapered spline teeth are positioned at least partially in individual ones of the tab slots in a clutch disengaged condition. The first tapered spline teeth when displaced further into the tab slots and toward the backing plate define a clutch engaged condition. A first friction plate is in frictional contact with the first reaction plate in the clutch engaged condition, the first friction plate when rotated generating a rotational force on the first reaction plate. The rotational force acts against the first tapered spline teeth to induce the first reaction plate to slidably move away from the backing plate.

20 Claims, 3 Drawing Sheets

(56) References Cited

U.S. PATENT DOCUMENTS

| | | |
|---|---|---|
| 8,185,285 B2 | 5/2012 | Dlugoss et al. |
| 8,197,377 B2 | 6/2012 | Hart et al. |
| 8,210,979 B2 | 7/2012 | Jones et al. |
| 8,251,849 B2 | 8/2012 | Holmes |
| 8,262,526 B2 | 9/2012 | Portell et al. |
| 8,307,970 B2 | 11/2012 | Burchett et al. |
| 8,346,451 B2 | 1/2013 | Otanez et al. |
| 8,364,361 B2 | 1/2013 | Olson et al. |
| 8,376,111 B2 | 2/2013 | Heitzenrater |
| 8,376,900 B2 | 2/2013 | Heitzenrater et al. |
| 8,397,890 B2 | 3/2013 | Kao |
| 8,409,053 B2 | 4/2013 | Samie et al. |
| 8,434,607 B2 | 5/2013 | Nausieda et al. |
| 8,449,423 B2 | 5/2013 | Wilton et al. |
| 8,463,482 B2 | 6/2013 | Rains et al. |
| 8,479,847 B2 | 7/2013 | Hart et al. |
| 8,500,588 B2 | 8/2013 | Diemer et al. |
| 8,545,354 B2 | 10/2013 | Jones et al. |
| 8,606,476 B2 | 12/2013 | Whitton et al. |
| 8,613,682 B2 | 12/2013 | Beckner et al. |
| 8,615,349 B2 | 12/2013 | Neelakantan et al. |
| 8,628,442 B2 | 1/2014 | Portell et al. |
| 8,794,416 B2 | 8/2014 | Weeter et al. |
| 8,813,933 B2 | 8/2014 | Harmon et al. |
| 8,813,935 B2 | 8/2014 | Hart et al. |
| 8,814,744 B2 | 8/2014 | Hart et al. |
| 8,844,702 B2 | 9/2014 | Lee et al. |
| 8,932,169 B2 | 1/2015 | Paciotti |
| 8,939,863 B2 | 1/2015 | Hart et al. |
| 8,965,650 B1 | 2/2015 | Otanez et al. |
| 9,038,802 B2 | 5/2015 | Reinhart et al. |
| 9,109,641 B2 | 8/2015 | Kremer et al. |
| 9,212,701 B2 | 12/2015 | Dziurda |
| 9,261,186 B2 | 2/2016 | Singh et al. |
| 9,347,537 B2 | 5/2016 | Coffey et al. |
| 9,360,053 B2 | 6/2016 | Mordukhovich |
| 9,382,998 B1 | 7/2016 | Hart et al. |
| 9,400,018 B2 | 7/2016 | Kremer et al. |
| 2013/0270054 A1* | 10/2013 | Dziurda ............... F16D 13/52 192/70.28 |

* cited by examiner

PASSIVE OPENING LOW LOSS CLUTCH PACK

FIELD

The present disclosure relates to friction clutch assemblies used in automobile automatic transmissions.

BACKGROUND

The statements in this section merely provide background information related to the present disclosure and may or may not constitute prior art.

A multi-speed automatic transmission uses frictional clutches having friction surfaces for example as lock-up clutches to temporarily lock a torque converter to a transmission input shaft, and clutches and brakes to change gear ratios during transmission shifting operations for both forward and reverse gear drives. Known clutch assemblies provide friction surfaces on multiple friction plates that engage multiple reaction plates when hydraulic pressure is applied to the clutch assembly. Known clutch assemblies use spline connections to individually couple the reaction plates and the friction plates to transmission structure or to components of the transmission. The spline connections, however provide only limited horizontal displacement.

When the clutch assembly is not engaged by hydraulic pressure it is desirable to maintain clearance between the friction surfaces and the reaction plates to reduce friction induced heat, friction surface wear, and the associated degradation of fuel economy. The limited horizontal displacement allowed by spline connections may not allow sufficient clearance between these components to be maintained and therefore may often induce heat, friction, and degraded fuel economy.

Thus, while current automatic transmission clutch assemblies achieve their intended purpose, there is a need for a new and improved device and method for reducing or eliminating splined clutch assemblies thereby allowing greater horizontal movement of the reaction plates to improve clutch assembly design.

SUMMARY

According to several aspects, a passive opening transmission clutch system includes a backing plate having multiple tab slots. A first reaction plate has multiple first tapered spline teeth. Individual ones of the first tapered spline teeth are positioned at least partially in individual ones of the tab slots. A first friction plate in frictional contact with the first reaction plate when the first tapered spline teeth are displaced further into the tab slots and toward the backing plate define a clutch engaged condition. The first friction plate when rotated generates a rotational force on the first reaction plate. The rotational force acts against the first tapered spline teeth to induce the first reaction plate to slidably move away from the backing plate.

In an additional aspect of the present disclosure, a second reaction plate having multiple second tapered spline teeth each positioned partially in one of the tab slots and displaced further into the tab slots in the clutch engaged condition.

In another aspect of the present disclosure, each of the first tapered spline teeth and each of the second tapered spline teeth includes an edge, one of the edges of each of the second tapered spline teeth and one of the edges of each of the first tapered spline teeth also directly contacting one of a plurality of tapered walls of each of the tab slots generating the force to induce the first reaction plate and the second reaction plate to slidably move away from the backing plate.

In another aspect of the present disclosure, a first friction plate is positioned proximate to the first reaction plate, the first friction plate including opposed first and second friction surfaces; and a second friction plate is positioned proximate to the second reaction plate, the second friction plate including opposed third and fourth friction surfaces.

In another aspect of the present disclosure, the first reaction plate contacts the first friction surface in the clutch engaged condition.

In another aspect of the present disclosure, the second reaction plate contacts the second friction surface and the third friction surface in the clutch engaged condition.

In another aspect of the present disclosure, each of the first tapered spline teeth is oriented substantially transverse with respect to a plane defined by the first reaction plate.

In another aspect of the present disclosure, each of the second tapered spline teeth is oriented substantially transverse with respect to a plane defined by the second reaction plate.

In another aspect of the present disclosure, each of the first tapered spline teeth and each of the second tapered spline teeth is oriented at an angle with respect to a longitudinal centerline the second reaction plate.

In another aspect of the present disclosure, the angle is less than 90 degrees.

In another aspect of the present disclosure, the rotational force acts to induce the first reaction plate to slidably move away from the backing plate in a direction transverse to a rotational direction of the first friction plate.

In another aspect of the present disclosure, each of the tab slots includes a tapered wall; and each of the multiple first tapered spline teeth includes an edge, the edge directly contacting the tapered wall of one of the tab slots.

In another aspect of the present disclosure, a wave plate positioned proximate to the first reaction plate; and a piston acts when subjected to a pressurized fluid to displace the wave plate into both the first reaction plate and the first friction plate to displace the first tapered spline teeth toward the backing plate.

In another aspect of the present disclosure, a biasing member acts to displace the piston away from the wave plate when the pressurized fluid is vented.

According to several aspects, a passive opening transmission clutch system includes a backing plate having multiple tab slots, each of the tab slots having a tapered wall. A first reaction plate has multiple first tapered spline teeth oriented transverse to a plane of the first reaction plate. Individual ones of the first tapered spline teeth are positioned at least partially in individual ones of the tab slots in a clutch disengaged condition, the first tapered spline teeth when displaced further into the tab slots and toward the backing plate defining a clutch engaged condition. A first friction plate is in frictional contact with the first reaction plate in the clutch engaged condition, the first friction plate when rotated generating a rotational force on the first reaction plate. The rotational force acts against the first tapered spline teeth to induce the first reaction plate to slidably move away from the backing plate.

In another aspect of the present disclosure, a second reaction plate having multiple second tapered spline teeth each positioned partially in one of the tab slots and displaced further into the tab slots in the clutch engaged condition, wherein each of the first tapered spline teeth and each of the second tapered spline teeth includes an edge.

In another aspect of the present disclosure, the tab slots each include a tapered wall, and wherein one of the edges of each of the second tapered spline teeth and one of the edges of each of the first tapered spline teeth also directly contact the tapered wall of one of the tab slots generating the force to induce the first reaction plate and the second reaction plate to slidably move away from the backing plate.

In another aspect of the present disclosure, the first friction plate further includes opposed first and second friction surfaces; and the first reaction plate contacts the first friction surface in the clutch engaged condition.

In another aspect of the present disclosure, a second friction plate is positioned proximate to the second reaction plate, the second friction plate including opposed third and fourth friction surfaces, wherein the second reaction plate contacts the second friction surface and the third friction surface, and the fourth friction surface contacts the backing plate in the clutch engaged condition.

According to several aspects, a passive opening transmission clutch system includes a backing plate having multiple tab slots, each of the tab slots having a tapered wall. A first reaction plate has multiple first tapered spline teeth oriented transverse to a plane of the first reaction plate. Individual ones of the first tapered spline teeth are positioned at least partially in individual ones of the tab slots in a clutch disengaged condition. The first tapered spline teeth when displaced further into the tab slots and toward the backing plate define a clutch engaged condition. A first friction plate is in frictional contact with the first reaction plate in the clutch engaged condition, the first friction plate when rotated generating a rotational force on the first reaction plate. A second reaction plate has multiple second tapered spline teeth oriented transverse to a plane of the second reaction plate. Individual ones of the second tapered spline teeth are positioned at least partially in individual ones of the tab slots in the clutch disengaged condition. A second friction plate is in frictional contact with the second reaction plate in the clutch engaged condition. The rotational force acts against the first tapered spline teeth and the second tapered spline teeth to induce the first reaction plate and the second reaction plate to slidably move away from the backing plate.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
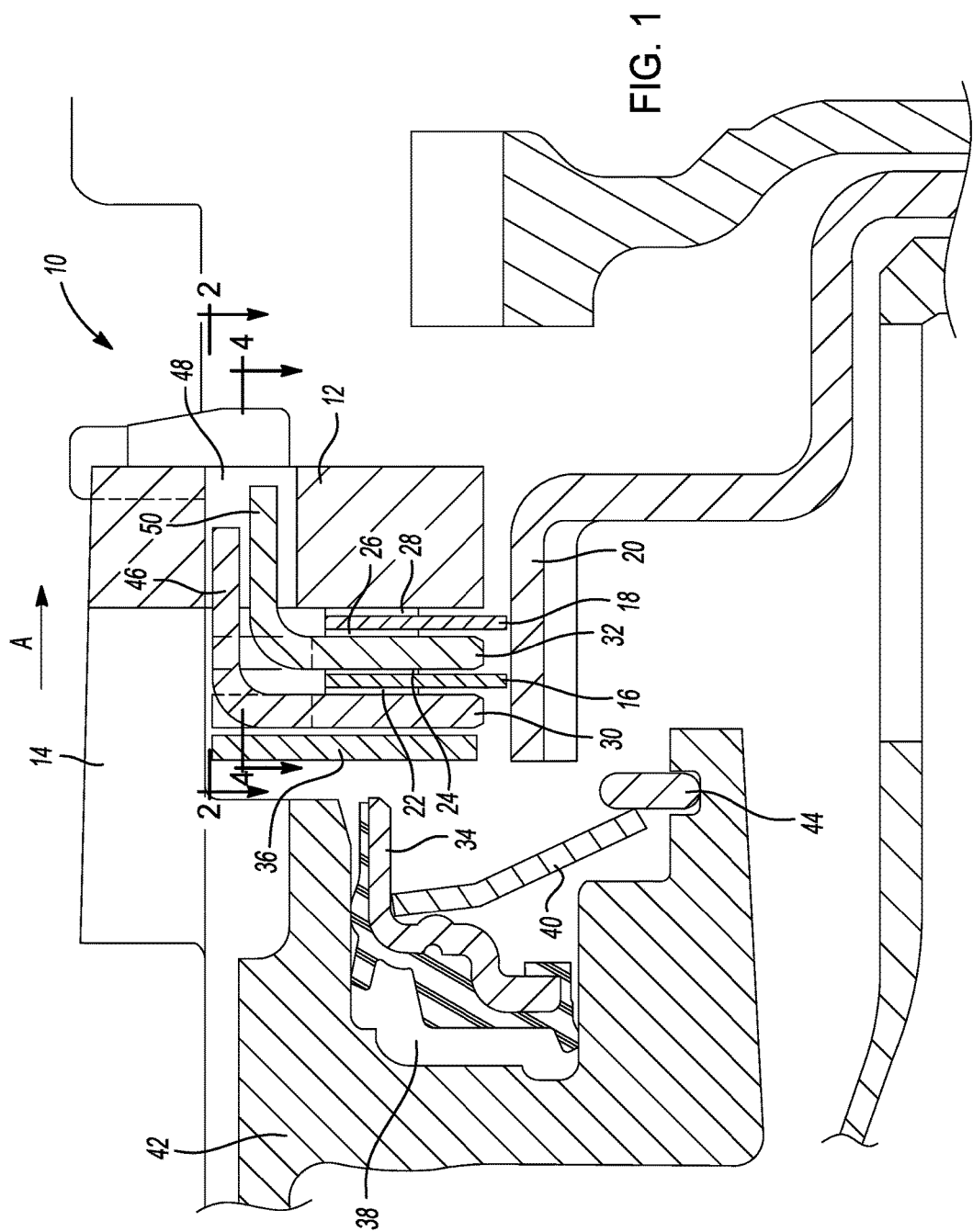
FIG. 1 is a cross sectional side elevational view of a passive open clutch pack of the present disclosure.

Referring to FIG. 1, a system having a passive open clutch pack 10 of the present disclosure includes a backing plate 12 connected for example by a spline to a transmission housing 14 of an automotive automatic transmission. A first friction plate 16 and a second friction plate 18 are individually splined to a hub 20. The hub 20 is connected to a transmission member (not shown) which can include a member of a planetary gear set or a transmission shaft. The first friction plate 16 and the second friction plate 18 therefore rotate with respect to the transmission housing. The first friction plate 16 includes a first friction surface 22 and an oppositely directed second friction surface 24. The second friction plate 18 includes a third friction surface 26 and an oppositely directed fourth friction surface 28. A first reaction plate 30 is positioned to be frictionally engaged by the first friction surface 22 when the passive open clutch pack 10 is applied (hydraulic pressure is applied). A second reaction plate 32 is positioned between the first friction plate 16 and the second friction plate 18 such that when the passive open clutch pack 10 is applied the second friction plate 18 is frictionally engaged by both the second friction surface 24 and the third friction surface 26. When the passive open clutch pack 10 is applied the fourth friction surface 28 is frictionally engaged with the backing plate 12.

In lieu of connecting the first and the second reaction plates 30, 32 to the housing 14 as is known, the first and the second reaction plates 30, 32 are freely disposed with respect to the housing 14 as will be further discussed below and in reference to FIGS. 2 through 5. The first and the second reaction plates 30, 32 are engaged with the first and the second friction plates 16, 18 by displacing a piston 34 in a clutch engagement direction "A" such that the piston 34 contacts a wave plate 36, displacing the wave plate 36 in the clutch engagement direction "A" into the first and the second reaction plates 30, 32 and the first and the second friction plates 16, 18. The piston 34 is displaced by porting a pressurized fluid such as a hydraulic fluid into a cavity 38, thereby elastically deflecting a biasing member 40 as the piston 34 displaces. A biasing force of the biasing member 40 returns the piston 34 to the position shown after the pressurized fluid is vented from the cavity 38. The piston 34 and the cavity 38 are located in a housing portion 42 of the housing 14. A retaining clip 44 is positioned in a slot of the housing portion 42 to retain the biasing member 40, as is known.

In lieu of connecting the first and the second reaction plates 30, 32 to the housing 14, the first reaction plate 30 includes multiple first tapered spline teeth 46 (only one of which is visible in this view) positioned about a perimeter of the first reaction plate 30. Each of the first tapered spline teeth 46 is received in one of a plurality of tab slots 48 (only one of which is visible in this view) created in the backing plate 12. Similarly, the second reaction plate 32 includes multiple second tapered spline teeth 50 (only one of which is visible in this view) positioned about a perimeter of the second reaction plate 32. Each of the second tapered spline teeth 50 is received in one of the plurality of tab slots 48 (only one of which is visible in this view) created in the backing plate 12, or in a similar but separate slot created in the backing plate 12 for this purpose. According to several aspects, each second tapered spline tooth 50 may be nested with (positioned radially inwardly from) a corresponding one of the first tapered spline teeth 46. According to further aspects, each of the second tapered spline teeth 50 may be fixed on a smaller radial locating circle from the first tapered spline teeth 46, but circumferentially offset from each of the first tapered spline teeth 46. According to further aspects, each of the second tapered spline teeth 50 may alternate on a same radius with one of the first tapered spline teeth 46, and therefore only one of the first tapered spline teeth 46 or one of the second tapered spline teeth 50 will be positioned in any one of the tab slots 48. Although only two friction plates and two reaction plates are shown, the passive open clutch pack 10 can also include a third or more friction plates and a third or more reaction plates within the scope of the present disclosure.

Referring to FIG. 2 and again to FIG. 1, each of the first tapered spline teeth 46 is formed as an integral extension or tab of the first reaction plate 30. According to several aspects, the first tapered spline teeth 46 are oriented substantially transverse to a plane "$P_1$" defined by the first reaction plate 30. The first tapered spline teeth 46 include a rectangular first portion 52 which transitions into a first tapered edge 54 and an oppositely positioned second tapered edge 56. The first and second tapered edges 54, 56 join at a tapered end 58. In a clutch open or disengaged position shown, the tapered end 58 is positioned within one of the tab slots 48 such that the tapered end 58 is received in a tapered opening of the tab slot 48 defined by a first tapered wall 60 and an oppositely directed second tapered wall 62. The first and the second tapered walls 60, 62 transition into a through bore 64 which extends through the backing plate 12. In the clutch open or disengaged position, only a contact point 66 is defined between one of the first or the second tapered edges 54 or 56 in direct contact with one of the first or the second tapered walls 60, 62. In the example shown, the contact point 66 is defined between the second tapered edge 56 of the first tapered spline tooth 46 and the second tapered wall 62 as the first friction plate 16 rotates in a direction of rotation "B" (into the page as viewed in FIG. 2).

In the clutch open or disengaged position shown, a first clearance "$C_1$" is maintained between the first reaction plate 30 and the first friction surface 22. Also in the clutch open or disengaged position a second clearance "$C_2$" is maintained between the second friction surface 24 and the second reaction plate 32. The first clearance "$C_1$" and the second clearance "$C_2$" are maintained by a sliding force acting on the first tapered spline teeth 46 in a sliding direction "D" created at the contact point 66 defined between the second tapered edge 56 of the first tapered spline tooth 46 and the second tapered wall 62 as the first friction plate 16 rotates in a direction of rotation "B". The sliding force provides a passive separation of the reaction plates from the friction plates sufficient to prevent frictional engagement of the first and the second friction surfaces 22, 24 and therefore provides a passive release of the friction elements of the passive open clutch pack 10, without requiring a biasing member or pressurized fluid to displace open the members of the passive open clutch pack 10.

Figure 2:
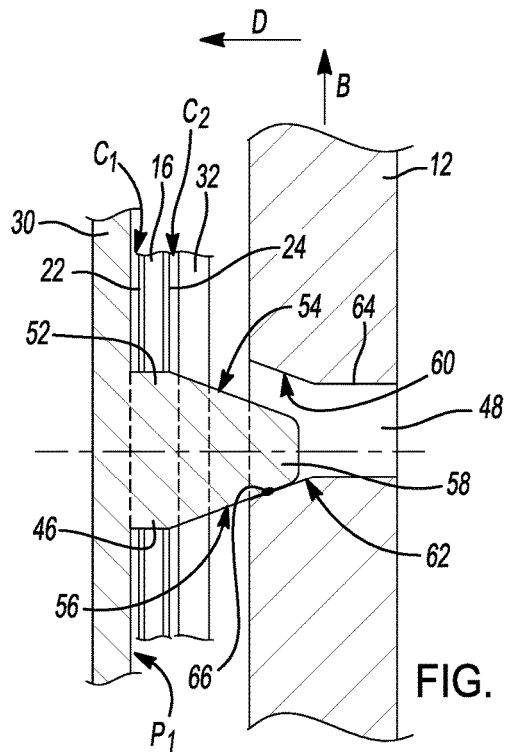
FIG. 2 is a partial cross sectional top plan view taken at section 2 of FIG. 1.

Referring to FIG. 3 and again to FIGS. 1 through 2, in a clutch applied or engaged position shown, hydraulic pressure applied to the piston 34 displaces the wave plate 36 in the clutch engagement direction "A" into the first and the second reaction plates 30, 32 and the first and the second friction plates 16, 18. The first tapered spline teeth 46 are concomitantly displaced further into the tab slots 48 until the first reaction plate 30 is frictionally engaged by the first friction surface 22 of the first friction plate 16 and the second friction surface 24 of the first friction plate 16 is engaged with the second reaction plate 32. At this time, the first tapered spline teeth 46 are each positioned creating full contact along the second tapered wall 62 of the tab slot 48 by a portion of the second tapered edge 56 of the first tapered spline tooth 46. At this full contact position, the tapered end 58 is positioned substantially within the through bore 64. It is noted that even at the full contact position with the second tapered wall 62, a clearance "E" is maintained at the opposite tapered wall, in this example between the first tapered edge 54 and the first tapered wall 60 of the tab slot 48. The clearance "E" ensures that the first tapered spline teeth 46 will not frictionally lock within the tab slots 48.

With continuing reference to FIG. 3 and again to FIGS. 1 and 2, when the fluid pressure to the piston 34 is relieved and the biasing member 40 acts to return the piston 34 away from contact with the wave plate 36, the passive sliding force acting on the first tapered spline teeth 46 in the sliding direction "D" acts to displace the first reaction plate 30, the second reaction plate 32, and the first friction plate 16 back to the clutch disengaged position shown in FIG. 2. It is noted that an opposite rotational direction of the friction plates from the rotational direction "B" will cause an equal but opposite contact between the first tapered spline teeth 46 in the tab slots 48, however, the passive sliding force acting on the first tapered spline teeth 46 in the sliding direction "D" will still be created.

Figure 3:
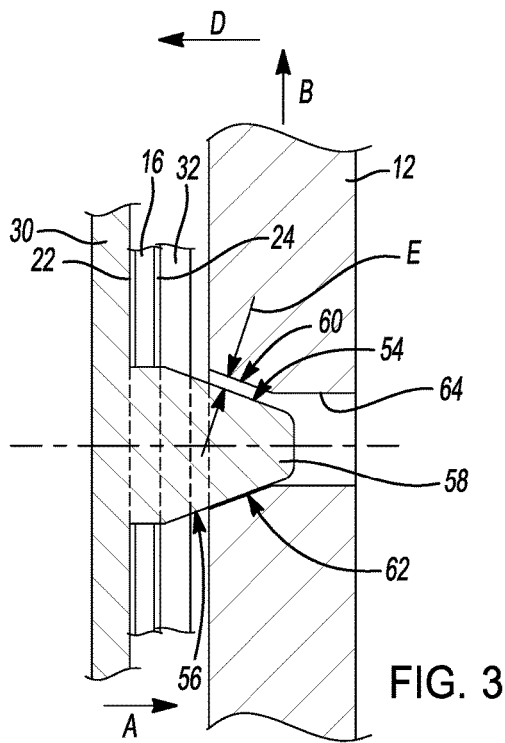
FIG. 3 is a partial cross sectional top plan view modified from FIG. 2.

Referring to FIG. 4 and again to FIGS. 1 through 3, each of the second tapered spline teeth 50 is formed as an integral extension or tab of the second reaction plate 32. According to several aspects, the second tapered spline teeth 50 are oriented substantially transverse to a plane "$P_2$" defined by the second reaction plate 32. The second tapered spline teeth 50 include a rectangular first portion 68 which transitions into a first tapered edge 70 and an oppositely positioned second tapered edge 72. Unlike the geometry of the first tapered spline teeth 46, the first and second tapered edges 70, 72 of the second tapered spline teeth 50 end at a junction 74. From the junction 74 a first straight edge 76 and an oppositely facing second straight edge 78 define a tooth end 80. The first straight edge 76 and the second straight edge 78 are both aligned substantially parallel with the wall defined by the through bore 64.

In the clutch open or disengaged position shown, each second tapered spline tooth 50 is positioned within one of the tab slots 48 such that the tooth end 80 is received in the tapered opening of the tab slot 48 defined by the first tapered wall 60 and the oppositely directed second tapered wall 62. The tooth end 80 extends partially into the through bore 64 which extends through the backing plate 12. In the clutch open or disengaged position, only a contact point 82 is defined between one of the first or the second tapered edges 70, 72 in direct contact with one of the first or the second tapered walls 60, 62. In the example shown, the contact point 82 is defined between the second tapered edge 72 of the second tapered spline tooth 50 and the second tapered wall 62 as the second friction plate 18 rotates in the direction of rotation "B" (into the page as viewed in FIG. 4).

In the clutch open or disengaged position shown, a first clearance "$F_1$" is maintained between the second reaction plate 32 and the third friction surface 26. Also in the clutch open or disengaged position a second clearance "$F_2$" is maintained between the fourth friction surface 28 and the backing plate 12. The first clearance "$F_1$" and the second clearance "$F_2$" are maintained by the passive sliding force acting on the second tapered spline teeth 50 in the sliding direction "D" created at the contact point 82 defined between the second tapered edge 72 of the second tapered spline tooth 50 and the second tapered wall 62 as the second friction plate 18 rotates in the direction of rotation "B". The passive sliding force is sufficient to prevent frictional engagement of the third and the fourth friction surfaces 26, 28 and therefore provides a passive release of the friction elements of the passive open clutch pack 10.

Referring to FIG. 5 and again to FIGS. 1 through 4, in the clutch applied or engaged position shown, hydraulic pressure applied to the piston 34 displaces the wave plate 36 in the clutch engagement direction "A" into the first and the second reaction plates 30, 32 and the first and the second friction plates 16, 18. The second tapered spline teeth 50 are concomitantly displaced further into the tab slots 48 until the second reaction plate 32 is frictionally engaged by the third friction surface 26 of the second friction plate 18 and the fourth friction surface 28 of the second friction plate 18 is engaged with the backing plate 12. At this time, the second tapered spline teeth 50 are each positioned creating full contact along the second tapered wall 62 of the tab slot 48 by a portion of the second tapered edge 72 of the second tapered spline tooth 50, and a clearance is provided between the second straight edge 78 of the tooth end 80 and the wall defined by the through bore 64. At this contact position, the tooth end 80 is positioned entirely within the through bore 64. It is noted that even at the full contact position with the second tapered wall 62, a clearance "G" is maintained between the opposite tapered wall, in this example the first tapered edge 70 and the first tapered wall 60 of the tab slot 48. The clearance "G" ensures that the second tapered spline teeth 50 will not frictionally lock within the tab slots 48.

Figure 4:
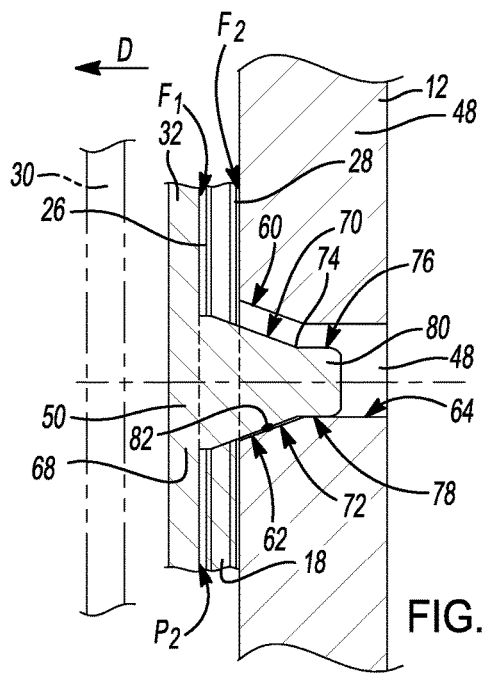
FIG. 4 is a partial cross sectional top plan view taken at section 4 of FIG. 1.
Figure 5:
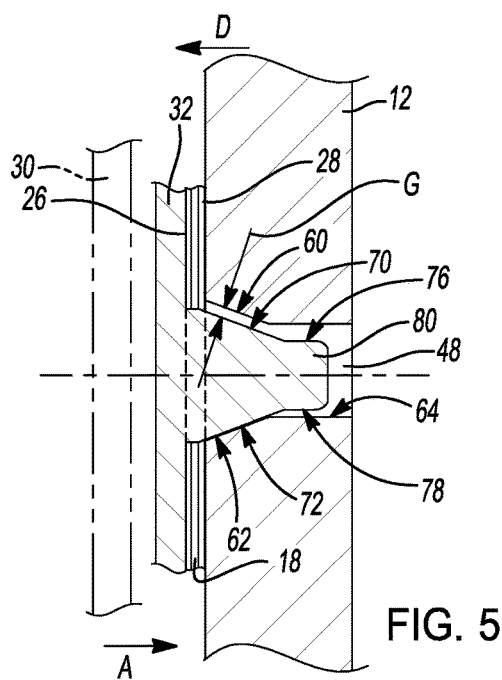
FIG. 5 is a partial cross sectional top plan view modified from FIG. 4.

With continuing reference to FIG. 5 and again to FIGS. 1 and 4, when the fluid pressure to the piston 34 is relieved and the biasing member 40 acts to return the piston 34 away from contact with the wave plate 36, the passive sliding force acting on the second tapered spline teeth 50 in the sliding direction "D" acts to displace the first reaction plate 30, the second reaction plate 32, and the second friction plate 18 back to the clutch disengaged position shown in FIG. 4. It is noted that an opposite rotational direction of the friction plates from the rotational direction "B" will cause an equal but opposite contact between the second tapered spline teeth 50 in the tab slots 48, however, the passive sliding force acting on the second tapered spline teeth 50 in the sliding direction "D" will still be created.

Referring to FIG. 6 and again to FIGS. 1 through 5, a passive open clutch pack 84 of the present disclosure is modified from the passive open clutch pack 10, therefore only the differences will be discussed further herein. Items of the passive open clutch pack 84 that are common with the passive open clutch pack 10 are identified with an apostrophe.

The passive open clutch pack 84 includes a backing plate 86 connected for example by a spline to a transmission housing 14' of an automotive automatic transmission. A first friction plate 16' and a second friction plate 18' are individually splined to a hub 20'. The hub 20 is connected to a rotating transmission member (not shown) which can include a member of a planetary gear set or a transmission shaft. The first friction plate 16' and the second friction plate 18' therefore rotate with respect to the transmission housing 14'. The first friction plate 16' includes a first friction surface 22' and an oppositely directed second friction surface 24'. The second friction plate 18' includes a third friction surface 26' and an oppositely directed fourth friction surface 28'. A first reaction plate 88 is positioned to be frictionally engaged by the first friction surface 22' when the passive open clutch pack 84 is applied (hydraulic pressure is applied). A second reaction plate 90 is positioned between the first friction plate 16' and the second friction plate 18' such that when the passive open clutch pack 84 is applied the second friction plate 18' is frictionally engaged by both the second friction surface 24' and the third friction surface 26'. When the passive open clutch pack 84 is applied the fourth friction surface 28' is frictionally engaged with the backing plate 86.

Figure 6:
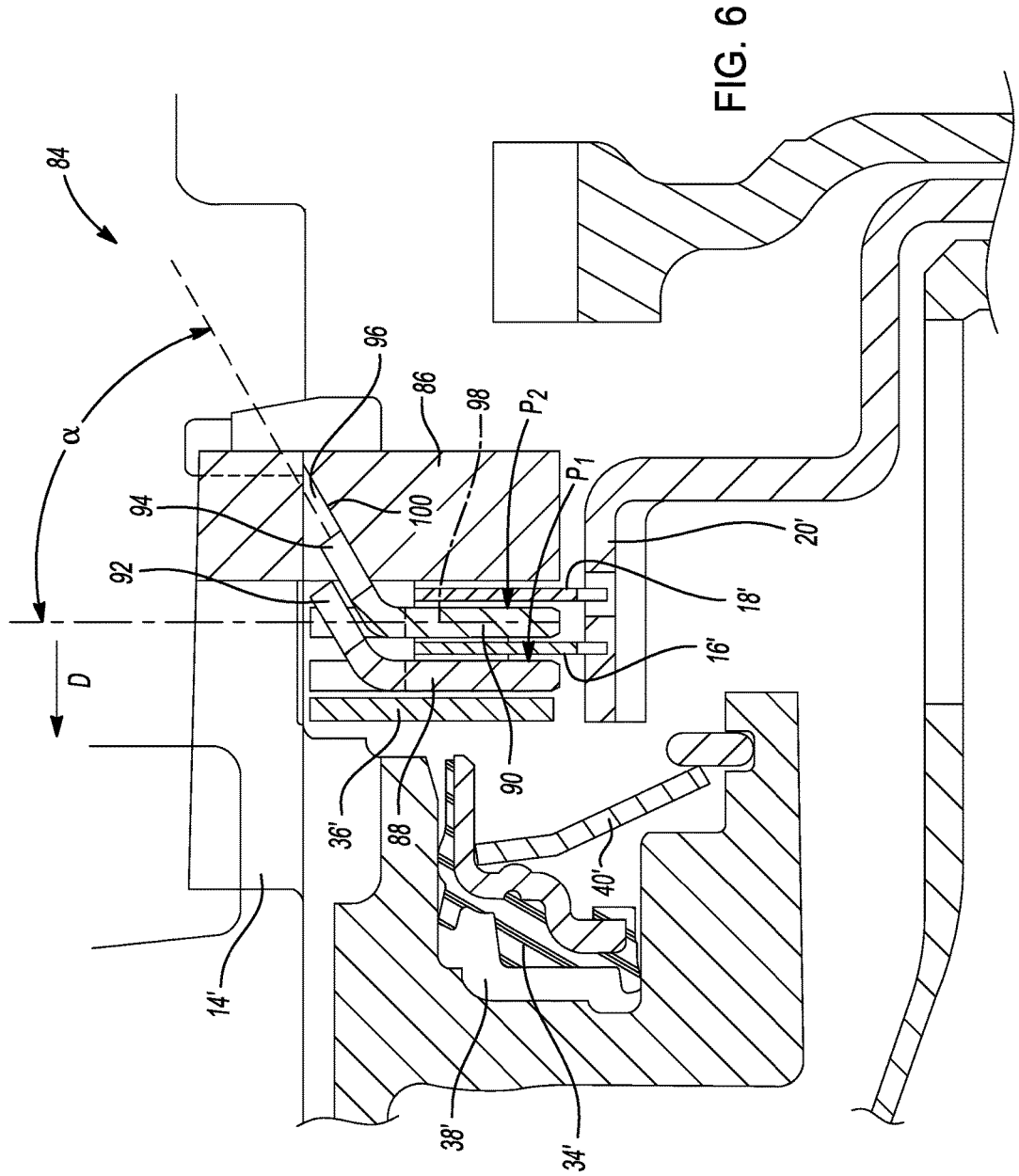
FIG. 6 is a cross sectional side elevational view of a passive open clutch pack of the present disclosure.

The first reaction plate 88 includes a plurality of first tapered spline teeth 92 which are similarly configured to the first tapered spline teeth 46. A second reaction plate 90 includes a plurality of second tapered spline teeth 94 which are similarly configured with respect to the second tapered spline teeth 50. In lieu of being oriented substantially perpendicular to a plane defined by the first reaction plate 88 or the second reaction plate 90, the first tapered spline teeth 92 and the second tapered spline teeth 94 are oriented at an angle alpha ($\alpha$) less than 90 degrees with respect to a central longitudinal axis of the reaction plates 88, 90 teeth, such as a central longitudinal axis 98 of the second reaction plate 90. The first and the second tapered spline teeth 92, 94 are therefore also angularly oriented with respect to a plane $P_1$, $P_2$ of the first reaction plate 88 and the second reaction plate 90. A plurality of tab slots 100 that are created in the backing plate 86 are also oriented at the angle $\alpha$. As shown in FIG. 6, the first tapered spline teeth 92 and the second tapered spline teeth 94 can be partially received in the tab slots 100, however the first tapered spline teeth 92 can also be nested directly on top of and in direct frictional contact with the second tapered spline teeth 94 to still achieve the sliding force acting on both the first tapered spline teeth 92 and the second tapered spline teeth 50 in the sliding direction "D" that achieves a passive opening of the clutch pack 84.

According to several aspects of the present disclosure, a passive opening transmission clutch system 10 or clutch pack 84 includes a backing plate 12, 86 having multiple tab slots 48, 96, each of the tab slots having a tapered wall 60, 62. A first reaction plate 30, 88 has multiple first tapered spline teeth 46, 92 angularly oriented with respect to a plane $P_1$ of the first reaction plate 30, 88. Individual ones of the first tapered spline teeth 46, 92 are positioned at least partially in individual ones of the tab slots 48, 96 in a clutch disengaged condition. The first tapered spline teeth 46, 92 when displaced further into the tab slots 48, 96 and toward the backing plate 12, 86 define a clutch engaged condition. A first friction plate 16, 16' is in frictional contact with the first reaction plate 30, 88 in the clutch engaged condition. The first friction plate 16, 16' when rotated generates a rotational force on the first reaction plate 30, 88. A second reaction plate 32, 90 has multiple second tapered spline teeth 50, 94 angularly oriented with respect to a plane $P_2$ of the second reaction plate 32, 90. Individual ones of the second tapered spline teeth 50, 94 are positioned at least partially in individual ones of the tab slots 48, 96 in the clutch disengaged condition. A second friction plate 18, 18' is in frictional contact with the second reaction plate 32, 90 in the clutch engaged condition. The rotational force acts against the first tapered spline teeth 46, 92 and the second tapered spline teeth 50, 94 to induce the first reaction plate 30, 88 and the second reaction plate 32, 90 to slidably move away from the backing plate 12, 86.

Passive open clutch packs of the present disclosure offer several advantages. These include the use of tapered spline teeth created on a reaction plate to force separation of the clutch elements when the clutch is open. The use of a flat tip on the tapered spline teeth limits a separation distance in an open clutch. The reaction plates in the present disclosure also function as partial return springs that aid is separating the clutch plates to reduce open clutch pack losses. The force or drag effect of an open clutch is used on the reaction plates to cause the plates to open.

The description of the invention is merely exemplary in nature and variations that do not depart from the gist of the invention are intended to be within the scope of the invention. Such variations are not to be regarded as a departure from the spirit and scope of the invention.

What is claimed is:

1. A passive opening transmission clutch system, comprising:
    a backing plate having multiple tab slots;
    a first reaction plate having multiple first tapered spline teeth, individual ones of the first tapered spline teeth positioned at least partially in individual ones of the tab slots in a clutch disengaged condition; and
    a first friction plate in frictional contact with the first reaction plate when the first tapered spline teeth are displaced further into the tab slots and toward the backing plate defining a clutch engaged condition;
    the first friction plate when rotated generating a rotational force on the first reaction plate;
    wherein the rotational force acts against the first tapered spline teeth to induce the first reaction plate to slidably move away from the backing plate.

2. The passive opening transmission clutch system of claim 1, further including a second reaction plate having multiple second tapered spline teeth each positioned partially in one of the tab slots and displaced further into the tab slots in the clutch engaged condition.

3. The passive opening transmission clutch system of claim 2, wherein each of the first tapered spline teeth and each of the second tapered spline teeth includes an edge, one of the edges of each of the second tapered spline teeth and one of the edges of each of the first tapered spline teeth also directly contacting one of a plurality of tapered walls of each of the tab slots generating the force to induce the first reaction plate and the second reaction plate to slidably move away from the backing plate.

4. The passive opening transmission clutch system of claim 2, further including:
    a first friction plate positioned proximate to the first reaction plate, the first friction plate including opposed first and second friction surfaces; and
    a second friction plate positioned proximate to the second reaction plate, the second friction plate including opposed third and fourth friction surfaces.

5. The passive opening transmission clutch system of claim 4, wherein the first reaction plate contacts the first friction surface in the clutch engaged condition.

6. The passive opening transmission clutch system of claim 4, wherein the second reaction plate contacts the second friction surface and the third friction surface in the clutch engaged condition.

7. The passive opening transmission clutch system of claim 2, wherein each of the second tapered spline teeth is oriented substantially transverse with respect to a plane defined by the second reaction plate.

8. The passive opening transmission clutch system of claim 2, wherein each of the first tapered spline teeth and each of the second tapered spline teeth is oriented at an angle in a direction toward the backing plate and with respect to a longitudinal centerline of the second reaction plate.

9. The passive opening transmission clutch system of claim 8, wherein the angle is less than 90 degrees.

10. The passive opening transmission clutch system of claim 1, wherein each of the first tapered spline teeth is oriented substantially transverse with respect to a plane defined by the first reaction plate.

11. The passive opening transmission clutch system of claim 1, wherein the rotational force acts to induce the first reaction plate to slidably move away from the backing plate in a direction transverse to a rotational direction of the first friction plate.

12. The passive opening transmission clutch system of claim 1, wherein:
    each of the tab slots includes a tapered wall; and
    each of the multiple first tapered spline teeth includes an edge, the edge directly contacting the tapered wall of one of the tab slots.

13. The passive opening transmission clutch system of claim 1, further including:
    a wave plate positioned proximate to the first reaction plate; and
    a piston acting when subjected to a pressurized fluid to displace the wave plate into both the first reaction plate and the first friction plate to displace the first tapered spline teeth toward the backing plate.

14. The passive opening transmission clutch system of claim 13, further including a biasing member acting to displace the piston away from the wave plate when the pressurized fluid is vented.

15. A passive opening transmission clutch system, comprising:
    a backing plate having multiple tab slots, each of the tab slots having a tapered wall;
    a first reaction plate having multiple first tapered spline teeth oriented transverse to a plane of the first reaction plate, individual ones of the first tapered spline teeth positioned at least partially in individual ones of the tab slots in a clutch disengaged condition, the first tapered spline teeth when displaced further into the tab slots and toward the backing plate defining a clutch engaged condition; and
    a first friction plate in contact with the first reaction plate in the clutch engaged condition, the first friction plate when rotated generating a rotational force on the first reaction plate;
    wherein the rotational force acts against the first tapered spline teeth to induce the first reaction plate to slidably move away from the backing plate.

16. The system of claim 15, further including a second reaction plate having multiple second tapered spline teeth each positioned partially in one of the tab slots and displaced further into the tab slots in the clutch engaged condition, wherein each of the first tapered spline teeth and each of the second tapered spline teeth includes an edge.

17. The system of claim 16, wherein one of the edges of each of the second tapered spline teeth and one of the edges of each of the first tapered spline teeth also directly contact the tapered wall of one of the tab slots generating the force to induce the first reaction plate and the second reaction plate to slidably move away from the backing plate.

18. The system of claim 16, wherein:
    the first friction plate further includes opposed first and second friction surfaces; and
    the first reaction plate contacts the first friction surface in the clutch engaged condition.

19. The system of claim 18, further including a second friction plate positioned proximate to the second reaction plate, the second friction plate including opposed third and fourth friction surfaces, wherein the second reaction plate contacts the second friction surface and the third friction surface, and the fourth friction surface contacts the backing plate in the clutch engaged condition.

20. A passive opening transmission clutch system, comprising:
- a backing plate having multiple tab slots, each of the tab slots having a tapered wall;
- a first reaction plate having multiple first tapered spline teeth oriented transverse to a plane of the first reaction plate, individual ones of the first tapered spline teeth positioned at least partially in individual ones of the tab slots in a clutch disengaged condition, the first tapered spline teeth when displaced further into the tab slots and toward the backing plate defining a clutch engaged condition;
- a first friction plate in frictional contact with the first reaction plate in the clutch engaged condition, the first friction plate when rotated generating a rotational force on the first reaction plate;
- a second reaction plate having multiple second tapered spline teeth oriented transverse to a plane of the second reaction plate, individual ones of the second tapered spline teeth positioned at least partially in individual ones of the tab slots in the clutch disengaged condition; and
- a second friction plate in frictional contact with the second reaction plate in the clutch engaged condition;
- wherein the rotational force acts against the first tapered spline teeth and the second tapered spline teeth to induce the first reaction plate and the second reaction plate to slidably move away from the backing plate.

* * * * *